United States Patent

Taylor et al.

[15] 3,654,660

[45] Apr. 11, 1972

[54] PHONOGRAPH RECORD VACUUM CLEANER

[72] Inventors: William W. Taylor, 16472 Malden Circle; Richard O. Spencer, 3952 Sirius Drive, both of Huntington Beach, Calif. 92647

[22] Filed: Apr. 16, 1970

[21] Appl. No.: 29,048

[52] U.S. Cl. ....................15/308

[51] Int. Cl. ....................A47l 5/22

[58] Field of Search....................15/303, 306, 308, 310, 311; 274/47

[56] References Cited

UNITED STATES PATENTS

| | | | |
|---|---|---|---|
| 3,005,223 | 10/1961 | Taylor et al. | 15/310 |
| 3,150,401 | 9/1964 | Taylor et al. | 15/311 |
| 1,416,200 | 5/1922 | Haynes, Jr. | 15/310 |
| 1,416,201 | 5/1922 | Haynes, Jr. | 15/310 |
| 2,437,340 | 3/1948 | Zugehoer | 15/310 |
| 2,976,551 | 3/1961 | Watts | 15/4 |

*Primary Examiner*—Walter A. Scheel
*Assistant Examiner*—C. K. Moore
*Attorney*—Harris, Kiech, Russell & Kern

[57] ABSTRACT

A housing provided therein with a vertically oriented slot of a size to receive a lower portion of a record on edge, means in the housing and engageable with the edge of a record in the slot for supporting the record for rotation about its axis, brushes carried by the housing and respectively extending along opposite edges of the slot and engageable with successive portions of opposite sides of a record in the slot as the record is rotated about its axis, vacuum means in the housing for flowing air into the housing through the slot to remove dust from opposite sides of the record and from the brushes, the air being exhausted through an outlet in the housing, and means in the housing for rotating the record about its axis as air flows into the housing through the slot.

3 Claims, 3 Drawing Figures

INVENTORS
WILLIAM W. TAYLOR,
RICHARD O. SPENCER
BY THEIR ATTORNEYS
HARRIS, KIECH, RUSSELL & KERN

PHONOGRAPH RECORD VACUUM CLEANER

BACKGROUND OF INVENTION

The present invention relates in general to a phonograph record cleaner and, more particularly, to one of the type which includes: a housing provided therein with a vertically oriented slot of a size to receive a lower portion of a record on edge; means in the housing and engageable with the edge of a record in the slot for supporting the record for rotation about its axis; means in the housing for rotating the record about its axis; brushes in the housing and engageable with successive portions of opposite sides of the record in the slot as the record is rotated about its axis, to remove dust from the record; and vacuum blower means for flowing air through the housing to discharge dust removed from the record by the brushes.

A phonograph record cleaner of the foregoing general type is disclosed in our U.S. Pat. Nos. 3,005,223, issued Oct. 24, 1961, and 3,150,401, issued Sept. 29, 1964, and particularly the latter patent.

SUMMARY AND OBJECTS OF INVENTION

The general object of the present invention is to provide a phonograph record cleaner which is an improvement on those disclosed in our aforementioned patents.

A primary object of the present invention is to provide brushes respectively extending along opposite edges of the slot and engageable with successive portions of opposite sides of a record in the slot as the record is rotated about its axis, and to provide vacuum blower means in the housing for flowing air through the slot, to an outlet in the housing, to remove dust from the brushes and from opposite sides of the record as the air passes through the slot. This construction provides a very simple and effective way of removing dust from opposite sides of the record and of disposing of the dust thus removed, which is an important feature.

Another and more specific object of the invention is to provide a phonograph record cleaner which includes: a vertical partition in the housing between the slot and the outlet and dividing the housing into inlet and outlet compartments respectively communicating with the slot and the outlet, the partition having a blower inlet opening therein; an axial intake blower in the outlet compartment for propelling air from the opening in the partition to the outlet so as to draw air by suction through the slot and into the inlet compartment to remove dust from opposite sides of the record and from the brushes, the blower and the opening in the partition being coaxial and the air intake of the blower being adjacent the opening; a motor in the outlet compartment and carrying the blower on its shaft; and record driving means carried by the motor shaft and frictionally engageable with the edge of a record in the slot for rotating the record about its axis.

The foregoing objects, advantages, features and results of the present invention, together with various other objects, advantages, features and results thereof which will be evident to those skilled in the phonograph record cleaner art in the light of this disclosure, may be achieved with the exemplary embodiment of the invention illustrated in the accompanying drawing and described in detail hereinafter

Figures 1, 2, 3:
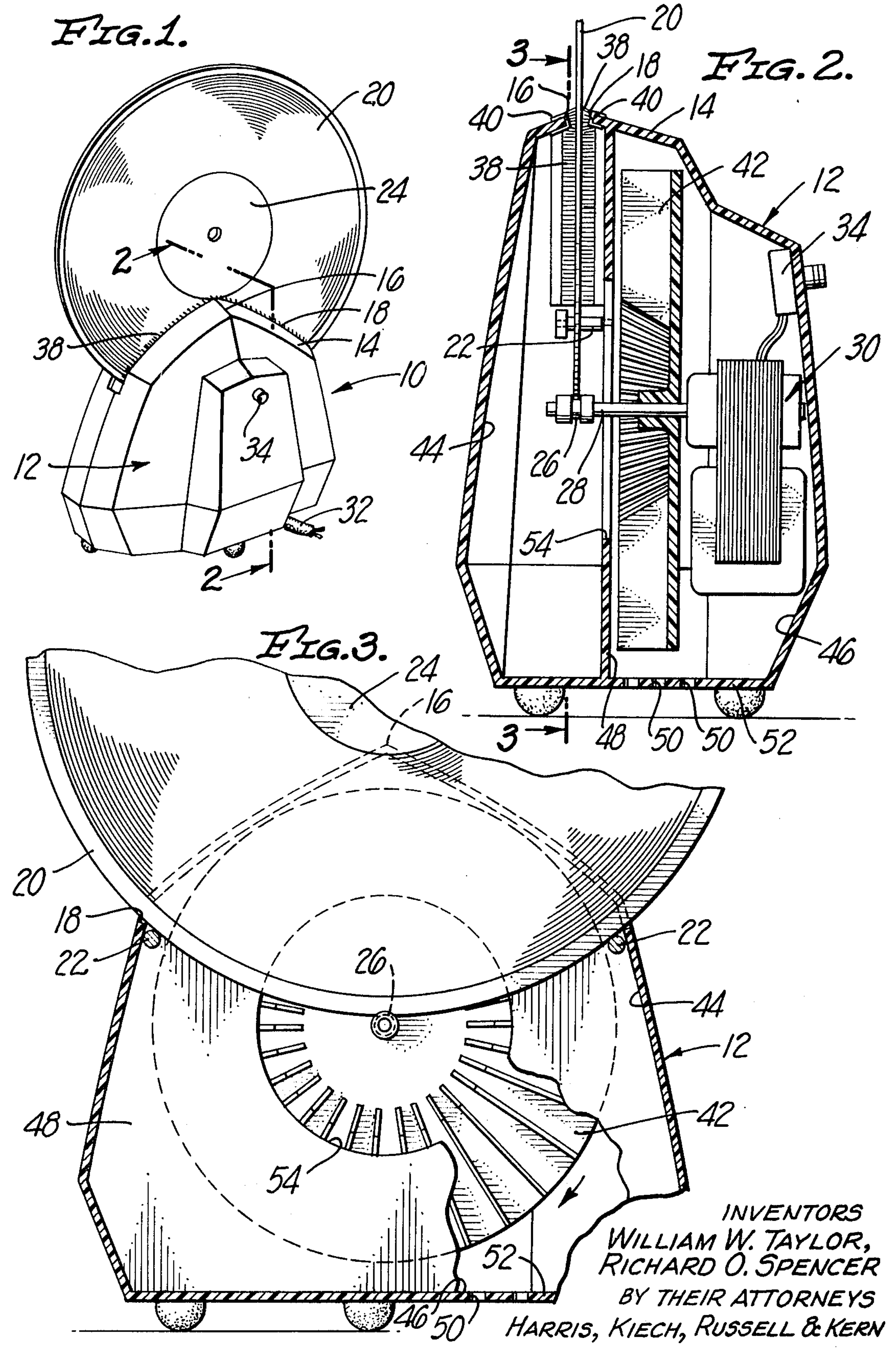
FIG. 1 is a perspective view of a phonograph record cleaner which embodies our invention.
FIG. 2 is an enlarged, longitudinal sectional view through the phonograph record cleaner taken as indicated by the arrowed line 2—2 of FIG. 1.
FIG. 3 is a transverse sectional view through the phonograph record cleaner taken as indicated by the arrowed line 3—3 of FIG. 2 of the drawing.

DETAILED DESCRIPTION OF EXEMPLARY Embodiment of Invention

In the drawing, the phonograph record cleaner of the invention is designated generally by the numeral 10 and includes a housing 12 having a top wall 14 which converges upwardly to an apex 16. The top wall 14 of the housing 12 is provided therein with a vertically oriented slot 18 of a size to receive a lower portion of a record 20 on edge.

The record 20 is supported on edge, with its lower portion in the upper portion of the housing 12, by a supporting means which comprises two spaced supporting pins 22, FIG. 3, located adjacent the respective ends of and extending transversely of the slot. The length of the slot 18 and the locations of the supporting pins 12 are such that a lower portion of the record 20 extending inwardly at least to the outer periphery of the label 24 thereon is disposed within the upper portion of the housing.

The record 20 is rotated about its axis by an elastomeric driving element 26 which frictionally engages the edge of the record intermediate the supporting pins 22, and which is rotatable about an axis parallel to the axis of the record itself. More particularly, the driving element 26 is carried by the shaft 28 of an electric motor 30 located within the housing 12 on the side thereof opposite the side having the slot 18 therein. The motor 30 may be connected to an electrical outlet by a cord 32, FIG. 1, and may be energized by means of a switch 34 carried by and accessible from the exterior of the housing 12. Two brushes 38 carried by the housing 12 respectively extend along opposite edges of the slot 18 and have soft bristles of sufficient length to engage successive portions of opposite sides of the record 20 as the record is rotated about its axis by the motor 30. It will be noted that the diameter of the driving element 26 is small as compared to that of the record 20 so that the speed of rotation of the record is relatively slow. The brushes 38 are shown as including channel-shaped bases 40 from which the bristles project and which fit over the top wall 14 of the housing 12 along the respective edges of the slot 18.

As will be apparent, the brushes 38 remove dust from opposite sides of the record 20 a the record is rotated by the motor 30. Such dust is disposed of by a vacuum blower means comprising a blower or blower wheel 42 which is also fixed on the motor shaft 28 at a point spaced from the driving element 26.

Considering how the blower 48 disposes of dust removed from the rotating record 20 by the brushes 38, the housing 12 is divided into inlet and outlet compartments 44 and 46 by a vertical partition 48 separating the slot 18 from an air outlet comprising outlet openings 50 shown as formed in the bottom wall 52 of the housing 12. As will be apparent from FIG. 2 of the drawing, the slot 18 communicates with the inlet compartment 44, while the outlet openings 50 communicate with the outlet compartment 46.

The blower 42 is of the axial intake, radial discharge type and has its axial intake positioned opposite and in close proximity to a blower inlet opening 54 formed in the partition 48 and coaxial with the blower.

With the foregoing construction, when the motor is energized to rotate the record 20 in the slot 18 and to rotate the blower 42, the blower acts as a vacuum means to draw air into the inlet compartment 44 through the slot 18, and between the bristles of the brushes 38, such air being discharged from the outlet compartment 46 through the outlet openings 50. The air flowing through the slot 18 and past opposite sides of the portion of the record 20 in the slot carries away dust removed from opposite sides of the record by the brushes 38, and discharges same through the outlet openings 50.

The phonograph record cleaner 10 does a very effective job of removing dust from opposite sides of the record 20. As will be apparent, the phonograph record cleaner 10 performs its function with a very simple structure having a minimum of parts so that it can be manufactured economically and sold inexpensively, which are important features.

Although an exemplary embodiment of the invention has been disclosed herein for purposes of illustration, it will be understood that various changes, modifications and substitutions may be incorporated in this embodiment without departing from the scope of the invention as defined by the claims appearing in the next section of this specification.

We claim as our invention:

1. In a phonograph record cleaner, the combination of:

a. a housing provided therein with a vertically oriented slot of a size to receive a lower portion of a record on edge;

b. means in said housing and engageable with the edge of a record in said slot for supporting the record for rotation about its axis;

c. brushes carried by said housing and respectively extending along opposite edges of said slot and engageable with successive portions of opposite sides of a record in said slot as the record is rotated about its axis;

d. an air outlet in said housing and spaced from said slot, said housing being imperforate except for said slot and said air outlet;

e. a partition in said housing between said slot and said outlet and dividing said housing into inlet and outlet compartments respectively communicating with said slot and said outlet;

f. said partition having a blower inlet opening therethrough;

g. a blower in said outlet compartment for propelling air from said opening to said outlet so as to draw air through said slot and into said inlet compartment with a vacuum action to remove dust from said brushes;

h. a motor in said outlet compartment and connected to said blower to drive same; and i. record driving means driven by said motor and engageable with the edge of a record in said slot for rotating the record about its axis.

2. A phonograph record cleaner as defined in claim 1 wherein said blower is an axial intake and radial discharge blower coaxial with and having its intake adjacent said opening.

3. A phonograph record cleaner according to claim 1 wherein said blower and said record driving means are carried by the shaft of said motor.

* * * * *